2,982,769
ACTIVE SUBSTANCE AND PROCESS FOR MANUFACTURING SAME

Paul Reuben Ulshafer, Summit, N.J., assignor to Ciba Pharmaceutical Products, Inc., Summit, N.J., a corporation of New Jersey No Drawing. Filed Feb. 11, 1955, Ser. No. 487,719

6 Claims. (Cl. 260—287)

This application is a continuation-in-part of my co-pending applications Serial Nos. 454,597, 468,161 and 481,490, filed September 7, 1954, November 10, 1954, and January 12, 1955, respectively, all now abandoned.

This invention relates to a new pure compound having valuable pharmacological activity, which is hereinafter called deserpidine, and salts thereof, and to a process for the manufacture thereof. The structural formula of deserpidine, otherwise known as 11-desmethoxy-reserpine, is as follows:

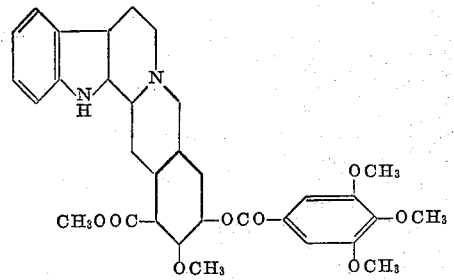

According to the present invention, deserpidine is prepared from plants of the Rauwolfia species, more particularly from *Rauwolfia canescens*, or furthermore from *Rauwolfia hirsuta* (also known as *Rauwolfia heterophylla*), *Rauwolfia tetraphylla*, *Rauwolfia indecora*, *Rauwolfia vomitoria Afz.* and *Rauwolfia cubana*. The new compound is preferably prepared from the roots of these plants.

Deserpidine melts at 228–232° C. and possesses an optical rotation $[\alpha]_D^{24.5} = -137 \pm 1°$ (in chloroform). Analysis shows the following results: C=66.42; H=6.76; N=4.89; $OCH_3$=26.90. Its empirical formula appears to be $C_{32}H_{38}O_8N_2$.

Deserpidine, in its behavior against solvents and acids, shows strong similarity to reserpine. It is fairly soluble in acetone, methanol, benzene, ethyl acetate, dilute acetic acid and halogenated aliphatic hydrocarbons, such as methylene chloride, ethylene chloride, trichloro ethylene and chloroform, and difficultly soluble or insoluble in ether, petrol ether, hexane and water. The new compound can be crystallized, for example, from methanol, acetone or ethyl acetate. Crystallized from methanol, it forms colorless prismatic needles (α-form) of the above melting point. It can also be obtained from methanol in the form of needles melting at 230–232° (β-form) and in the form of prisms having double melting point of 138° and 226–232° with resolidifying at 175° (γ-form). It is a weak base [pKa' 6.68 (40% methanol)] and forms salts such as the difficultly soluble hydrochloride, a nitrate, sulfate, oxalate or a picrate. It dissolves in an excess of dilute acetic acid, thus forming the acetate. Its ultraviolet spectrum in ethanol has a maximum at 272 mu (log approx. 4,2); another maximum at 217 mu (log approx. 4,8) and a minimum at 244 mu (log approx. 3,9). The infrared absorption spectrum of the α-form (in Nujol) shows the following characteristic bands classified in groups of diminishing strength: strong bands at 1731, 1715, 1590, 1504, 1415, 1332, 1274, 1250, 1226, 1124, 1100, 1005, 977, 761, 728 $cm^{-1}$; medium bands at 1357, 1349, 1190, 1174, 1108, 1100 $cm^{-1}$; medium-weak bands at 3246, 1065, 1043, 1030, 1018, 870, 770, 737 $cm^{-1}$; weak bands at 942, 927, 915, 901, 854, 835, 799 $cm^{-1}$.

Deserpidine has a complex pharmacological action, which is primarily characterized by a strong, relatively fast onsetting, and prolonged sedative effect, and a less pronounced hypotensive effect. It can be used as medicament for producing sedation and for the treatment of hypertension. For therapeutical use deserpidine or its salts may be made up into pharmaceutical compositions which comprise deserpidine or its salts substantially free from combined alkaloids and other materials associated with plants of the Rauwolfia species together with a pharmaceutical adjuvant as a carrier. The compositions provided by the invention may be in any suitable solid or liquid dosage form, especially in a form suitable for oral or parenteral administration, e.g. tablets, powder, capsules, pills, solutions, emulsions or suspensions, e.g. in the form of ampouled injectable solutions. As pharmaceutical carriers there may be employed materials or mixtures of such which do not react with deserpidine and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, cholesterol, tragacanth, alcohol or others may be employed. In preparing the novel compositions the pure deserpidine or its salts are admixed with the pharmaceutical carrier and formulated in the desired dosage unit form according to pharmaceutical practice. The compositions may be sterilized and may contain auxiliary substances such as preservative, stabilizing, wetting or emulsifying substances, salts for the control of the osmotic pressure or buffer substances or besides pure deserpidine other therapeutically active substances, for example such as are used in combination with reserpine. As therapeutically active substances which may be present in the compositions, there may be mentioned other hypotensive active substances, such as ganglionic blockers, e.g. N,N,N',N'-3-pentamethyl - N,N' - diethyl-3-azapentylene-1,5-diammonium dibromide, hexamethylene bis-trimethylammonium bromide, pentamethylene bis-methylpyrrolidinium ditartrate or 2-(2'-dimethylaminoethyl)-4,5,6,7-tetrachloroisoindoline dimethochloride; adrenergic blockers, e.g. 2-(N'-p-tolyl-N'-m-hydroxyphenyl-aminomethyl)-imidazoline or active derivatives of ergot alkaloids; hydrazino-pyridazines e.g. 1,4-dihydrazino-phthalazine or 1-hydrazino-phthalazine; Rauwolfia alkaloids in pure form e.g. reserpine; analogues of reserpine e.g. 3,4,5-trimethoxy-cinnamoyl methyl reserpate or acetyl-methyl reserpate; analogues of deserpidine, e.g. 3,4,5-trimethoxy-cinnamoyl methyl deserpidate. There may also be mentioned sedative active substances such as barbiturates, 3-ethyl-3-phenyl-2,6-dioxo - piperidine, N-(3'-dimethylaminopropyl)-3-chloro-phenthiazine; central nervous stimulants, such as methyl α-piperidyl-(2)-phenyl acetate or dl-α-methyl-phenylethylamine; cholinergic blocking agents such as diethylaminoethyl α-cyclohexyl-α-phenyl-α-hydroxy acetate methobromide, atropine or diethylaminoethyl 9-xanthenecarboxylate methobromide; or antihistaminics such as 2-[benzyl-(2'-dimethylaminoethyl)-amino]-pyridine.

In contrast to the heterogeneous and crude preparations from plants of the Rauwolfia species, the present invention provides many advantages with compositions made up from pure deserpidine obtained according to the invention. The exact amount of the dose to produce a certain effect can be indicated. In addition, the effect and the potency of such compositions are uniform and unvarying. Deserpidine, being a pure crystalline alkaloid, lends itself to the preparation of novel solutions which can be administered parenterally, for example, intravenously, which is not possible with the whole roots and crude extracts.

Deserpidine is also a valuable intermediate product for the preparation of other pharmacologically active and therapeutically useful compounds. Thus, according to my copending applications Serial Nos. 468,162 and 471,519, filed November 10, 1954 and November 26, 1954 respectively, all now abandoned deserpidine can be converted by partial hydrolysis into methyl deserpidate, from which new valuable esters can be obtained. Such esters are for example O-(3,4-dimethoxy-benzoyl)-methyl deserpidate and O-furoyl-(2)-methyl deserpidate, which show sedative and hypotensive activity and can be used as medicaments causing sedation and for the treatment of hypertension. According to that application, deserpidine can also be converted into deserpidic acid, which serves as an intermediate, for example for the preparation of deserpidic acid esters, such as the above described methyl deserpidate or other alkyl deserpidates.

The process for the preparation of the new active compound consists in isolating the substance having the above said properties from plants of the Rauwolfia species with the use of extractive and purifying methods adapted to the physical and chemical properties of the new compound.

A preferred procedure for obtaining the new compound is characterized by extracting plant material of plants of the Rauwolfia species or a crude extract obtained therefrom in a manner adapted to the properties of the new compound, with an organic solvent only partially miscible with water, especially a weakly polar to non-polar one, so as to produce a sedative active extract, and isolating deserpidine therefrom using purifying methods.

As starting material there is used, according to this procedure, for example, the finely ground plant material of Rauwolfia plants, especially root material and preferably material from *Rauwolfia canescens*, or also *Rauwolfia hirsuta, Rauwolfia tetraphylla, Rauwolfia indecora, Rauwolfia cubana* and *Rauwolfia vomitoria Afz*. Crude extracts obtained therefrom which are also suitable for the above mentioned extraction with the organic solvent which is only partially miscible with water are advantageously alcohol extracts, such as extracts obtained with the use of lower alkanols, preferably methanol or ethanol, which may have been kneaded with water and then again separated from water, and which have preferably been treated with a lipoid solvent such as petroleum ether or hexane. The so-called "oleoresins" also suitable as crude extracts may be obtained as follows:

A crude alcohol extract of the finely ground plant material of Rauwolfia species is evaporated to dryness and then preferably kneaded first with water; the insoluble residue thus obtained is then treated with 2-N-hydrochloric acid, dried and extracted continuously with a lipoid solvent, such as petroleum ether, the brown residue thereby produced is then treated with 95 percent ethanol and the brown solution obtained after filtration with suction evaporated to dryness.

For further purification the crude extracts may be extracted with cyclic ethers or acetals, such as tetrahydrofurane, dioxane, or dioxolanes such as glycol acetal, whereby resinous components are removed.

According to the invention, the plant material or the crude extracts obtained therefrom, for example as indicated above, are extracted with an organic solvent only partially miscible with water, especially a weakly to non-polar one. Examples of weakly polar to non-polar solvents are preferably halogenated aliphatic hydrocarbons, such as methylene chloride, ethylene chloride, trichloroethylene or chloroform, or solvents such as benzene, ethyl acetate, ether or mixtures thereof. This extraction may advantageously be carried out in the presence of a polar solvent, such as a lower alkanol, e.g. methanol or ethanol and the like, and/or in the presence of water, which may be added. There may be added to the water, bases, acids or salts such as ammonia, inorganic or organic acids such as hydrochloric acid, phosphoric acid or acetic acid, sodium carbonate, sodium bicarbonate, potassium biphosphate or potassium bisulfate. If a mixture of the organic solvent only partially miscible with water and a polar solvent is used, it is of advantage to separate the solution obtained into two phases by adding water. It is, however, possible to distribute the starting material between a mixture of water and a polar solvent and the organic solvent which is only partially miscible therewith. The distribution should preferably take place over several separation stages. The fractions with the organic solvent only partially miscible with water thus obtained can be evaporated to dryness and the residue worked up directly to deserpidine according to the invention.

Another method of obtaining a crude extract suitable for carrying out the process consists in treating plant material of Rauwolfia plants or a crude extract therefrom obtained, for example as indicated above, with an aqueous acid agent so as to produce a sedative active aqueous acidic solution containing the new sedative and hypotensive active compound. Aqueous acid agents suitable for this purpose are, for example, lower fatty acids such as formic acid, acetic acid or propionic acid, or a phosphoric acid or an acid salt of a polybasic acid. The acid solution of the new compound thus obtained can, for the purpose of further working up, either be concentrated to a smaller volume or diluted with water or left unchanged. It may be treated with lipoid solvents, such as petrol ether or hexane. The thus obtained acid solution is then extracted according to the invention with the organic solvent which is only partially miscible with water. The obtained extracts can be washed neutral and evaporated to dryness.

The above mentioned methods can be combined in an appropriate manner. Thus, plant material of the Rauwolfia species may be treated simultaneously with an alcohol, the aqueous acid agent and the organic solvent only partially miscible with water, or the plants may first be extracted with an alcohol, which extract is then dissolved in the aqueous acid agent, such as acetic acid, which, in turn, is then extracted with the organic solvent, preferably after treatment with a lipoid solvent. In the preparation of the extracts useful for the isolation of deserpidine, it is also possible to work in such a way that at any step in the process an extract, for example an extract obtained with methanol from roots, is mixed with a carrier substance such as "Hyflo," "Charcel DIC" (diatomaceous earths) or another silicate, and the remaining steps in the process are carried out. The active substance can, for instance, be extracted from the dry carrier substance with one of the mentioned aqueous acid agents or by means of an organic solvent, preferably in admixture with a polar solvent. To facilitate the isolation of deserpidine, the extracts may be further subjected to an electrodialysis or paper-electrophoresis.

According to the present invention it is possible to isolate deserpidine from its solution in the organic solvent only partially miscible with water by purification in various ways. In general, it is advantageous to disintegrate the extract to be used according to the process with an adsorption agent, preferably by chromatography with an adsorption agent such as aluminum oxide, silicic acid, "Hyflo" (diatomaceous earth) or another silicate. This is preferably done after removing easier crystallizing by-products, for example reserpine by crystallization from methanol. The adsorption procedure may be repeated. From the adsorption agent deserpidine is then eluted, preferably by benzene. It can be further purified by crystallization, for example from methanol. It is, however, possible to obtain deserpidine in pure form by crystallizing the mentioned extracts directly from solvents such as methanol, acetone and ethyl acetate, preferably using the method of fractionated crystallization.

Other methods for the preparation of the new compound consist in treating crude extracts obtained in accordance with the invention from plants of the Rauwolfia species with acids or salts suitable for salt formation with weak bases, so as to obtain a separation and then isolating deserpidine from its thus obtained salts which are in admixture with accompanying substances, or in subjecting crude extracts, for example, methanolic extracts, preferably after a precipitation with aqueous ammonia, to an electrodialysis or a paper-ionophoresis, for example in aqueous acetic acid solution, thus removing resinous components and isolating deserpidine.

Thus a crude extract can be treated with nitrates, chlorides, sulfates, picrates, picrolonates, perchlorates, or sulfonates, or complex salts of heavy metals suitable for the formation of difficultly soluble alkaloid salts, e.g. phosphotungstates, phosphomolybdates, mercuryiodates or the corresponding acids. Depending on the nature of the salts or acids used, the reaction may be carried out, for example, in alcoholic such as methanolic solution. An acetic acid solution may be treated with a mixture of sodium nitrate and sodium chloride and calcium oxide and the salt precipitate separated. From the crude salts deserpidine may advantageously be isolated by setting free the bases and isolating the deserpidine therefrom in accordance with the invention. Thus the above mentioned precipitate may be treated with methanolic ammonia and deserpidine isolated therefrom by disintegration on an adsorbent, or by fractional crystallization, or preferably a combination of these methods. These methods may be combined with the above mentioned processes in an appropriate way.

The invention as described above comprises also a method for producing the new compound characterized by isolating deserpidine from mother liquors of a reserpine-crystallization obtainable in a process for the manufacture of reserpine from Rauwolfia plants.

In carrying out the processes of the invention, it is of special importance to know that deserpidine (α-form or in solution) possesses in the IR-spectrum a band at 728 cm.$^{-1}$ not shared by reserpine, whereas deserpidine does not show the 1625 cm.$^{-1}$ band of reserpine.

Depending on the method of working, deserpidine is obtained in the form of the base or its salts. From the base, therapeutically useful salts can be obtained, such as that of the hydrohalic acids, sulfuric acid, nitric acid, perchloric acid, phosphoric acids, acetic acid, propionic acid, lactic acid, oxalic acid, succinic acid, malic acid, tartaric acid, citric acid, ascorbic acid, methane sulfonic acid, ethane sulfonic acid, hydroxyethane sulfonic acid, benzoic acid, salicylic acid, p-amino-salicylic acid and toluene sulfonic acid, by reacting the deserpidine with such acids in the presence or absence of a diluent. The salts can also be obtained by double decomposition. Of especial interest is deserpidine phosphate for reason of its water solubility. Thus, an aqueous solution for injection can be made by dissolving deserpidine phosphate in water for injection.

The following examples illustrate the invention, the relation between parts by weight and parts by volume being the same as that between the gram and the cubic centimeter.

*Example 1*

500 parts by weight of dried, finely ground roots of *Rauwolfia canescens* are extracted batch-wise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of a thick syrupy solution. After the addition of 75 parts by volume of methanol and 150 parts by volume of acetic acid of 15 percent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the 4th and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of a mixture containing principally reserpine sets in. After filtering this mixture and washing it with cool methanol, the filtrate is freed of solvent in vacuo. 2 parts by weight of the resulting red-brown solid froth are triturated with 2 portions each of 25 parts by volume of benzene and filtered each time. The benzene insoluble material is saved for further treatment. The benzene soluble fraction is poured on to a column of 40 parts by weight of activated alumina (Woelm, Activity Grade I) which is then eluted first with 3 portions each of 50 parts by volume of benzene and then with 6 portions each of 50 parts by volume of benzene-acetone (9:1), the first of which benzene-acetone portions had been used for extraction of the above mentioned benzene insoluble material. The second of the 6 benzene-acetone elution fractions on removal of the solvents gives a light tan solid froth which on crystallization from methanol gives colorless prismatic needles of slightly impure deserpidine. Rechromatographing of 1 part by weight of this substance on 20 parts by weight of activated alumina (Woelm, Activity Grade I) using benzene and benzene containing 0.1 percent methanol as eluting agents followed by crystallization from methanol gives colorless prismatic needles of pure deserpidine, melting at 228–232° C.

Deserpidine obtained according to this example can be made up into pharmaceutical preparations. For example, the following compositions in tablet or injectable form may be mentioned:

|  | Mg. |
|---|---|
| (1) Deserpidine | 0.1 |
| (2) Lactose | 53.4 |
| (3) Gelatine | 1.0 |
| (4) Starch | 40.0 |
| (5) Magnesium stearate | 0.3 |
| (6) Talcum | 5.2 |
|  | 100.0 |

| (1) Deserpidine | mg | 1.0 |
|---|---|---|
| (2) Ethanol | cc | 0.25 |
| (3) Propylene glycol | cc | 0.25 |
| (4) Water | cc | 0.5 |
| Total |  | 1.00 |

In making the tablet a homogeneous mixture is prepared from 1 and 2, a paste is made with 3 and part of 4. The paste is mixed with 1 and 2 and the remainder of 4 to form a moist homogeneous mass which is then granulated and dried. After this, 5 and 6 are added and the product tableted.

*Example 2*

500 parts by weight of dried, finely ground roots of *Rauwolfia canescens* are extracted batch-wise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of thick syrupy solution. After the addition of 75 parts by volume of methanol and 150 parts by volume of acetic acid of 15 percent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the 4th and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of a mixture containing principally reserpine sets in.

0.665 part by weight of the above product is dissolved in 8 parts by volume of methylene chloride, treated with 0.05 part by weight of activated charcoal which is then removed by filtration, using 2 parts by volume of methylene chloride as a wash. While the methylene chloride is distilled off it is replaced by 6 parts by volume of methanol. The distillation is continued until the methylene chloride is removed and a volume of approximately 2 parts by volume of methanol remains. After standing overnight at −5°, the crystals of impure reserpine are filtered and washed with three portions each of 0.25 part by volume of cold methanol. The mother liquor and wash from the above crystals is evaporated in vacuo to a tan solid residue. 0.85 part by weight of this is dissolved with warming in 2.1 parts by volume of acetone. Needles crystallize from the warm solution. After standing for 2 hours at room temperature, the crystals are filtered, washed with cold acetone, and dried in vacuo at 50° for several hours. 0.236 part by weight of these crystals are dissolved in boiling acetone, the solution concentrated to a volume of 1.7 parts by volume, cooled at room temperature, whereupon crystallization sets in. After standing at room temperature overnight, the crystals are filtered, washed with cold acetone, and dried in vacuo at 50° for 5 hours. 0.143 part by weight of these crystals are dissolved in 0.56 part by volume of warm methanol. The crystals dissolve readily and from the solution there crystallize rapidly rosettes of tiny prismatic needles. After standing at room temperature overnight, the crystals are filtered and washed with cold methanol. The thus obtained deserpidine melts at 228–232°.

*Example 3*

To a solution of 0.2 part by weight deserpidine in 3 parts by volume of methanol and 0.1 part by volume of methylene chloride is added 0.2 part by volume of dilute sulfuric acid (1 part by volume sulfuric acid: 4 parts by volume water). After boiling out the methylene chloride, the solution is allowed to stand at 5° for a few hours. The salt of deserpidine with sulfuric acid crystallizes with water from this solution in white needles, which after filtering and washing with methanol melt at 266–269° (dec.).

*Example 4*

0.2 part by weight of deserpidine is slurried with 1 part by volume methanol. Methanol saturated with gaseous hydrochloric acid is added until all deserpidine is in solution. The resulting solution is evaporated to dryness. From 1 part by volume 95 percent ethanol, the hydrochloride of deserpidine crystallizes with water as needles. The needles are filtered and washed with ethanol; they melt at 253–256° (dec.).

*Example 5*

To a solution of 0.2 part by weight of deserpidine in 3 parts by volume of methanol and 0.1 part by volume of methylene chloride is added 0.05 part by volume of dilute nitric acid (1 part nitric acid: 4 parts water). Crystallization begins immediately. After cooling at 5°, the plates are filtered and washed with methanol. The thus obtained salt of deserpidine with nitric acid melts at 254–260° (dec.).

*Example 6*

0.2 part by weight of deserpidine is dissolved in 3 parts by volume of methanol and 0.1 part by volume of methylene chloride. 0.3 part by volume of oxalic acid solution (1 part by weight anhydrous oxalic acid: 10 parts by volume water) is added. After boiling out the methylene chloride, the solution is cooled at 5° for several hours. The white crystals formed are filtered and washed with methanol. The thus obtained salt of deserpidine with oxalic acid melts at 239–243° (dec.).

*Example 7*

Deserpidine can be converted into deserpidic acid, methyl deserpidate, O-(3,4-dimethoxy-benzoyl)-methyl deserpidate and O-furoyl-(2)-methyl deserpidate in the following manner:

To 1 part by weight of deserpidine in 20 parts by volume of methanol is added a solution of 2 parts by weight of potassium hydroxide in 10 parts by volume of water. This mixture is refluxed for 2 hours under an atmosphere of nitrogen. At the end of this period all the deserpidine is dissolved and the resulting solution is filtered through glass wool. After cooling, glacial acetic acid (3 parts by volume) is added to give the solution a pH of about 6. The solution is then evaporated in vacuo to a white, solid froth, which is triturated with 25 parts by volume of ether and filtered. The ether insoluble portion is similarly treated with two portions each of 25 parts by volume of ether. The white, ether-insoluble solid is triturated once with 100 parts by volume of acetone and then with 5 portions each of 50 parts by volume of acetone. After each trituration the mixture is filtered and the filtrates evaporated to dryness in vacuo. The white, solid froths thus resulting from the first four triturations are combined and crystallized from methanol, yielding white prisms, melting at 267–269° (dec.). The product is recrystallized by dissolving in a large volume of methanol and methylene chloride, filtering and concentrating until a small volume of methanol remains. After two such recrystallizations deserpidic acid is obtained in the form of white prisms melting at 270-273° (dec.) and analyzing for the empirical formula $$C_{21}H_{26}O_4N_2$$

To 0.5 part by weight of deserpidine is added a solution of 0.05 part by weight of sodium in 25 parts by volume of methanol. The mixture is refluxed under nitrogen for one hour during which the deserpidine all dissolves. After cooling, the solution is concentrated in vacuo to a volume of about 10 parts by volume. 30 parts by volume of water are added and then concentrated hydrochloric acid in a dropwise manner until the solution is strongly acidic. It is then extracted with 15 parts by volume of ether and re-extracted with 3 portions each of 10 parts by volume of ether. The aqueous phase is then made basic with concentrated aqueous ammonia and extracted with 15 parts by volume of methylene chloride and re-extracted with 3 portions each of 10 parts by volume of methylene chloride. The combined methylene chloride extracts are dried over anhydrous potassium carbonate and concentrated in vacuo to give methyl deserpidate as a pale, yellow solid froth which analyzes for the empirical formula $C_{22}H_{28}O_4N_2$.

Methyl deserpidate can also be obtained from deserpidic acid by reaction with diazomethane in methanolic solution. In the same manner, using diazoethane, ethyl deserpidate can be obtained; using other diazoalkanes, such as diazopropane or -butane, the corresponding esters are obtained. Instead of employing diazoalkanes, the alcohols in the presence of an acid catalyst such as hydrochloric acid may be employed to esterify the deserpidic acid. The esterifying agent may be employed in equivalent amounts or in excess.

0.5 part by weight of methyl deserpidate, dried by distilling toluene under vacuum from it twice, is dissolved in 5 parts by volume of dry distilled pyridine. 0.5 part by volume of 2-furoyl chloride (freshly distilled) is added with cooling. The resulting precipitate is re-dissolved by the addition of 2 parts by volume of dry benzene. After standing at 5° C. for 5 days the reaction mixture is poured into 50 parts by volume water and ice. 12 parts by volume of 5 percent aqueous ammonia are added and the mixture triturated for about 10 minutes. It is then extracted with 50 parts by volume methylene chloride and re-extracted with 15 parts by volume and then with 10 parts by volume of the same solvent. The combined extracts are washed with 2 portions each of 10 parts by volume sodium chloride solution, dried over anhydrous potassium carbonate and concentrated in vacuo. 0.720 part by weight of the residue is dissolved in 15 parts by volume of dry benzene and chromatographed on 14 parts by weight activated alumina (Woelm; Activity No. 1). From the fractions eluted with 200 parts by volume of benzene and with 100 parts by volume of benzene containing 0.1 percent methanol, followed by removal of the solvents and crystallization from methanol, O-furoyl-(2)-methyl deserpidate is obtained in fine, white needles, melting at 245-247°. It has sedative and hypotensive activity. It analyzes for the empirical formula $C_{27}H_{34}O_6N_2$ and shows the optical rotation $[\alpha]_D^{25} = -141° \pm 0.5°$ (chloroform).

To a solution of 0.5 part by weight of methyl deserpidate in 4 parts by volume of dry, distilled pyridine is added 0.5 part by weight of 3,4-dimethoxy-benzoyl chloride in 2 parts by volume of benzene, dropwise and with cooling and stirring. 1 part by volume of pyridine is used to rinse the reagent into the reaction flask which is stoppered and kept at 5° C. for 5 days. The reaction mixture is poured into 50 parts by volume of water containing ice. 2 parts by volume of concentrated aqueous ammonia in 10 parts by volume of water are added. After trituration for 5 minutes, the mixture is extracted with 3 portions of methylene chloride: 50 parts by volume, 15 parts by volume and 10 parts by volume. The combined methylene chloride extracts are washed twice with 10 parts by volume of saturated sodium chloride solution. After drying over anhydrous potassium carbonate, the solution is filtered and evaporated in vacuo to dryness. The tan solid froth is crystallized from 5 parts by volume of methanol to give crystals melting at 211-215°. This, on recrystallization from methanol after activated charcoal treatment in methanol-methylene chloride solution, gives white prisms of O-(3,4-dimethoxy-benzoyl)-methyl deserpidate having sedative and hypotensive activity and melting at 213-216°. Its optical rotation is $[\alpha]_D^{25.5} = -140° \pm 2°$ (chloroform) and it analyzes for the empirical formula $C_{31}H_{36}O_7N_2$.

*Example 8*

Deserpidine may be made up, in addition to the pharmaceutical preparations described in Example 1, for example into the following preparations:

|   |   | G. |
|---|---|---|
| (1) | Deserpidine | 0.50 |
| (2) | Tragacanth BC | 3.00 |
| (3) | Lactose | 134.50 |
| (4) | Corn starch | 3.75 |
| (5) | Talcum | 7.50 |
| (6) | Magnesium stearate | 0.75 |
|   |   | 150.00 |

The deserpidine and tragacanth are mixed together and then mixed with the lactose. The resulting mixture is granulated with 3A alcohol 50 percent and passed through a No. 10 screen. It is then dried thoroughly and passed through a No. 16 screen. The granulation is then mixed with the talcum, corn starch and magnesium stearate and the resulting granulation after rescreening tableted into tablets of 150 mg. weight each.

| (1) | Deserpidine | 0.125 g. |
|---|---|---|
| (2) | Citric acid, anhydrous | 0.125 g. |
| (3) | Benzyl alcohol | 1.000 ml. |
| (4) | Polyethylene glycol 300 special | 5.000 ml. |
| (5) | Water for injection to make | 50.000 ml. of solution. |

This preparation for injection is obtained by dissolving the deserpidine in the benzyl alcohol, and adding the solution of the critic acid in 1 ml. of water for injection. After mixing the polyethylene glycol is added and the whole mixed well. Water for injection is slowly added to make up a 50 ml. solution, which is then filtered through a coarse porosity sintered glass funnel.

Furthermore, the following pharmaceutical preparation may be mentioned:

|   |   | G. |
|---|---|---|
| (1) | Deserpidine | 0.025 |
| (2) | Diethylaminoethyl α-cyclohexyl-α-phenyl-α-hydroxy acetate methobromide | 5.000 |
| (3) | Tragacanth | 1.125 |
| (4) | Corn starch | 2.250 |
| (5) | Lactose | 36.150 |
| (6) | Magnesium stearate | 0.450 |
|   |   | 45.000 |

This preparation is made up into 50 mg. tablets coated with shellac, sucrose, flour and titanium dioxide.

|   |   | G. |
|---|---|---|
| (1) | Deserpidine | 0.100 |
| (2) | 1-hydrazino-phthalazine hydrochloride | 25.000 |
| (3) | Tragacanth | 4.500 |
| (4) | Lactose | 96.025 |
| (5) | Corn starch | 3.750 |
| (6) | Talcum | 4.500 |
| (7) | Magnesium stearate | 1.125 |
| (8) | Citric acid anhydrous | 15.000 |
|   |   | 150.000 |

This preparation is made up into 150 mg. tablets.

|   |   | G. |
|---|---|---|
| (1) | Deserpidine | 0.200 |
| (2) | 1-hydrazino-phthalazine hydrochloride | 50.000 |
| (3) | Tragacanth | 6.000 |
| (4) | Lactose | 132.300 |
| (5) | Corn starch | 5.000 |
| (6) | Talcum | 5.000 |
| (7) | Magnesium stearate | 1.500 |
|   |   | 200.000 |

This preparation is made up into 200 mg. tablets.

*Example 9*

1000 parts by weight of ground root of *Rauwolfia indecora* are refluxed for one hour with 4000 parts by volume of methanol. The extract is then filtered while hot. The roots are then re-extracted three times with refluxing methanol, filtering the extract hot each time, using 2000 parts by volume of methanol for one half hour, then 2000 parts by volume of methanol for one-quarter hour, then 1000 parts by volume of methanol for one-quarter hour. The combined filtrates are concentrated to 150 parts by volume. To this viscous solution 150 parts by volume of methanol and 300 parts by volume of 15 percent acetic acid are added, and the mixture is extracted with two portions each of 200 parts by volume of hexane. Each hexane extract is re-extracted with a solution of 25 parts by volume of methanol and 25 parts by volume of 15 percent acetic acid. The combined aqueous phases and washes are then extracted four times with 200 parts by volume of benzene. These combined benzene extracts are washed with 70 parts by volume of 20 percent potassium carbonate, then three times with 20 percent sodium chloride, dried over anhydrous potassium carbonate, and concentrated in vacuo to give a brown frothy residue. Crystallization of this material from methanol gives a first crop, M.P. 267–274° C., and a second crop, M.P. 260–270° C. The second crop is recrystallized from methanol, and the re-crystallization mother liquor material crystallized and recrystallized from acetone to give deserpidine.

*Example 10*

To 500 parts by weight of ground root of *Rauwolfia canescens*, 600 parts by volume of water and 1500 parts by volume of thiophene-free benzene are added and the mixture is refluxed for one hour, then filtered while hot. The root is then re-extracted twice by refluxing with 1000 parts by volume of benzene and 100 parts by volume of water, once for 30 minutes and once for 15 minutes, and the extracts filtered while hot each time. These filtrates are combined and concentrated in vacuo to give a tan solid. This is taken up in 8.0 parts by volume of methanol and 4.0 parts by volume of hexane. A small amount of insoluble material which settles out overnight is filtered. The filtrate is concentrated to dryness in vacuo and taken up in 10 parts by volume of methanol. Enough 17 percent nitric acid is added slowly and with shaking to bring the pH to 3. The solution is then diluted with 2 parts by volume of ether and allowed to stand at room temperature for 20 hours, during which a crystalline nitrate settles out. This material, M.P. 252–256° C. (dec.), is filtered, dissolved in methanol, and concentrated aqueous ammonia added till the solution is slightly basic. The crystalline base, M.P. 252–256° C., which settles out is filtered and recrystallized from methanol to give crystals, M.P. 262–265° C. The mother liquor material from this crystallization is taken down to dryness, then dissolved in a little acetone to give deserpidine in needle-like crystals.

*Example 11*

5000 parts by weight of dried and finely ground roots of *Rauwolfia canescens* are extracted batch-wise with methanol at its boiling point using the following volumes and times and filtering each extract while hot: 11000 parts by volume, 2 hours; 5000 parts by volume, 1 hour; 6000 parts by volume, 1 hour; 6000 pars by volume, 1 hour. The combined extracts are evaporated in vacuo to a volume of 4000 parts by volume. Insoluble solids are removed by filtration and the filtrate is further concentrated under vacuum to a volume of 900 parts by volume of a red-brown viscous syrup. 4000 parts by volume of water are added and then concentrated aqueous ammonia (ca. 15 parts by volume) until the solution has a pH of 7.2. After standing overnight at room temperature, the supernatant is decanted from a red-brown tarry residue, which is dried under vacuum and at room temperature for 3 days. A partially dried and very hygroscopic dark brown solid is obtained.

13.6 parts by weight of the above solid is dissolved in 80 parts by volume of methanol and 80 parts by volume of 1.7 percent phosphoric acid. This solution is extracted twice with 50 parts by volume of hexane. The hexane extracts are washed with a mixture of 10 parts by volume of methanol and 10 parts by volume of 1.7 percent phosphoric acid. These washes plus the original aqueous acidic phase are then extracted four times with methylene chloride, twice with 50 parts by volume and twice with 20 parts by volume. The fourth extract is kept separate and used subsequently as a wash of the sodium carbonate and sodium chloride washes. The first three extracts are combined and washed with 50 parts by volume of 5 percent sodium carbonate, then twice with 20 parts by volume of 20 percent sodium chloride solution. The combined extracts are then dried over anhydrous potassium carbonate and concentrated in vacuo to give a brown solid. This gives on crystallization from methanol a crystalline material, M.P. 263–266° C., which is recrystallized. The re-crystallization mother liquor is taken down to dryness and taken up in a little acetone, whereupon deserpidine crystallizes in fine needles. Deserpidine can also be crystallized from ethyl acetate; it melts then at 228–232° C.

*Example 12*

To 500 parts by weight of ground root of *Rauwolfia canescens*, 600 parts by volume of water and 1500 parts by volume of ethylene chloride are added, and the mixture refluxed for 55 minutes, then filtered while still hot.

The root is then re-extracted twice by refluxing with 900 parts by volume ethylene chloride and 100 parts by volume of water for twenty minutes, and filtering the extract hot each time. These filtrates are combined and concentrated in vacuo to give a tan solid.

This material is triturated with warm hexane three times, twice with 50 parts by volume and once with 15 parts by volume, filtering each time. The hexane insoluble material is taken up in 10 parts by volume methanol, and 17 percent nitric acid added slowly and with shaking till a pH of about 3 is reached. 2 parts by volume of ether are then added and the solution allowed to stand at room temperature for 3 days, then at 5° C. for one day, after which the nitrate formed is filtered off. From the mother liquor two more crops of nitrate are obtained, the first after one day at room temperature, and the second after eight days at room temperature. These three crops are combined and crystallized twice from methanol to give a nitrate, M.P. 234–242° C. (dec.). This is dissolved in approximately 5 parts by volume of methanol and a few drops concentrated ammonium hydroxide added. After a few hours a basic material, M.P. 248–252° C., separates and is filtered. This is recrystallized from 5 parts by volume methanol to give crystals of melting point 257–266° C. The mother liquor of this material is concentrated to dryness and taken up in acetone to give crystalline deserpidine.

*Example 13*

5000 parts by weight of dried and finely ground roots of *Rauwolfia canescens* are extracted batch-wise with methanol at its boiling point using the following volumes and times and filtering each extract while hot: 11000 parts by volume, 2 hours; 5000 parts by volume, 1 hour; 6000 parts by volume, 1 hours; 6000 parts by volume, 1 hour. The combined extracts are evaporated in vacuo to a volume of 4000 parts by volume. Instoluble solids are removed by filtration, and the filtrate is further concentrated under vacuum to a volume of 900 parts by volume of a red-brown viscous syrup. 4000 parts by volume of water are added and then concentrated aqueous ammonia (ca. 15 parts by volume) until the solution has a pH of 7.2. After standing overnight at room temperature, the supernatant is decanted from a red-brown tarry residue, which is dried under vacuum and at room temperature for 3 days. A partially dried and very hygroscopic dark brown solid is obtained.

20 parts by weight of this material is subjected to electrodialysis, employing a 4 compartment cell, the compartments of which are separated by suitable membranes. Compartment I consists of a platinum cathode and 250 parts by volume of water through which carbon dioxide is bubbled. Compartment II contains 20 parts by weight of the above crude alkaloid extract dissolved in 100 parts by volume of acetic acid and 35 parts by volume of methanol. Compartment III contains 150 parts by volume of water and compartment IV, 100 parts by volume of 50 percent sulfuric acid and a platinum anode. The cell is operated for 55 hours at an average current of 200 milliamperes and an initial voltage of 310 volts which drops to an average of 30 volts within 2 hours. The average temperature of the cell is 30°. Twice during the operation of the cell the light ember-colored solution is withdrawn from compartment I and replaced with fresh water. The three portions of solution from compartment I are combined and kept under refrigeration until worked up.

To these solutions from Compartment I, totalling approximately 350 parts by volume, concentrated ammonium hydroxide is added slowly and with shaking until the solution is at pH 7.5–8. A total of 24 parts by volume is used. This produces a tan precipitate which is filtered after standing at 5° C. for one hour. After drying this material, it is triturated with two portions each of 50 parts by volume of warm acetone containing 2 percent methanol, then once with 50 parts by volume of acetone containing 5 percent methanol. The insoluble material is filtered and the filtrate shaken with 2.0 parts by weight of alumina and re-filtered through Hyflo filtercel. Concentrating the filtrate to dryness yields a tan solid material. This is taken up in 5 parts by volume of methanol. After addition of 0.5 part by volume of water and one drop concentrated ammonium hydroxide, and standing at 5° C. for 18 hours, a crystalline product, M.P. 262–265° C., is obtained. A second crop, M.P. 260–264° C., is obtained after 6 days at 5° C. These two crops of crystals are combined and re-crystallized from methanol. The mother liquor, on concentrating to dryness and crystallizing from acetone, gives crystalline deserpidine.

Example 14

500 parts by weight of dried and finely ground roots of Rauwolfia canescens are covered with 2000 parts by volume of 15 percent acetic acid and allowed to stand at room temperature for 18 hours. The extract is then filtered and the root material is stirred for one hour with 2000 parts by volume of 15 percent acetic acid. After filtration, the root material is stirred for one-half hour with 1000 parts by volume of 15 percent acetic acid and filtered. The three extracts are combined and extracted with 3 portions each of 500 parts by volume of benzene. The combined benzene extracts are washed with 260 parts by volume of a 23 percent potassium carbonate solution. At this point the pH of the extract is 9. The benzene extract is made neutral by washing with 300 parts by volume of water. After drying over sodium sulfate and evaporating the benzene, a light tan froth is obtained. 0.64 part by weight of this is dissolved in 1 part by volume of methanol. White crystals, melting at 258–262° C. are obtained. 0.31 part by weight of this crystalline material is dissolved in methylene chloride and filtered. Methanol is added and the methylene chloride boiled out. A first and second crop, melting at 259–263° C. and 249–255° C., respectively, are taken. The mother liquor of the second crop is evaporated to dryness and the residue is crystallized from a small volume of acetone. This gives deserpidine as white needles.

Example 15

5000 parts by weight of dried and finely ground roots of Rauwolfia canescens are extracted batch-wise with methanol at its boiling point using the following volumes and times and filtering each extract while hot: 11000 parts by volume, 2 hours; 5000 parts by volume, 1 hour; 6000 parts by volume, 1 hour; 6000 parts by volume, 1 hour. The combined extracts are evaporated in vacuo to a volume of 4000 parts by volume. Insoluble solids are removed by filtration, and the filtrate is further concentrated under vacuum to a volume of 900 parts by volume of a red-brown viscous syrup. 4000 parts by volume of water are added and then concentrated aqueous ammonia (ca. 15 parts by volume) until the solution has a pH of 7.2. After standing overnight at room temperature, the supernatant is decanted from a red-brown tarry residue, which is dried under vacuum and at room temperature for 3 days. 170 parts by weight of a partially dried and very hygroscopic dark brown solid is obtained.

40 parts by weight of the above solid are purified by triturating with 200 parts by volume of 95 percent ethanol, heating to boiling and filtering. The insoluble portion is discarded and the filtrate is evaporated to dryness. The brown solid residue is subjected to a distribution between equal volumes of the upper and lower phases from an equilibration of chloroform with an equal volume of a 1:1 mixture of methanol and water. The distribution is carried out over 6 separatory funnels, each containing 200 parts by volume of the upper phase and 200 parts by volume of the lower phase. The lower phases of the 5th and 6th separatory funnels are dried over sodium sulfate, filtered, evaporated and the residues combined. 9 parts by weight of this brown solid residue is triturated with 50 parts by volume of benzene and filtered. The benzene insoluble material is triturated again with 50 parts by volume of benzene and filtered. The insoluble portion is discarded and the soluble portions are combined and chromatographed on 180 parts by weight alumina (Woelm; Activity I, neutral). Fractions of 250 parts by volume are collected starting with benzene as the first eluant; followed by benzene containing 0.1 percent, 0.2 percent, 0.5 percent and 1 percent methanol. White crystalline material, M.P. 260–266° C., is obtained from the fractions eluted with benzene containing 0.5 percent methanol. This material is recrystallized from a small volume of methanol giving crystals, M.P. 263–268° C., which are filtered off. A second crop of small white prisms is then obtained, which represents deserpidine.

Example 16

To a solution of 0.3 part by weight of deserpidine in 2 parts by volume of chloroform is added 0.04 part by volume of 85 percent phosphoric acid in 1 part by volume of methanol. The solution is evaporated to dryness in vacuo and the resulting pale-yellow solid is dried phosphorous pentoxide for three days under vacuum and at room temperature. The dried solid is dissolved in 2 parts by volume methanol. Addition of 20 parts by volume ether gives a white precipitate which is filtered, washed with ether, and dried over phosphorous pentoxide for 18 hours under vacuum and at room temperature. The white powder sinters at 185° and decomposes at about 220°. The thus obtained phosphoric acid salt of deserpidine contains about 3 moles of water.

What is claimed is:

1. A member of the group consisting of the crystalline article of manufacture, deserpidine, having the structural formula:

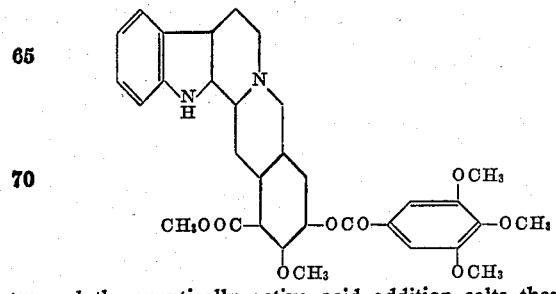

and therapeutically active acid addition salts thereof.

2. The acid addition salt of the product of claim 1 wherein the acid is hydrochloric acid.

3. The acid addition salt of the product of claim 1 wherein the acid is nitric acid.

4. The acid addition salt of the product of claim 1 wherein the acid is sulphuric acid.

5. The acid addition salt of the product of claim 1 wherein the acid is oxalic acid.

6. The acid addition salt of the product of claim 1 wherein the acid is phosphoric acid.

References Cited in the file of this patent

UNITED STATES PATENTS 2,752,351    Schlittler _____ June 26, 1956

OTHER REFERENCES

J. Indian Chemical Society, V. 18 (January 1942) pp. 33–39.

J.A.C.S., V. 76, pp. 1695–6 (Jan. 11, 1954 effective date).

Naturwissenschaften, V. 41 (1954) pp. 479–480.

UNITED STATES PATENT OFFICE
CERTIFICATION OF CORRECTION

Patent No. 2,982,769                      May 2, 1961

Paul Reuben Ulshafer

It is hereby certified that error appears in the above numbered patent requiring correction and that the said Letters Patent should read as corrected below.

Column 1, lines 25 to 36 and column 14, lines 63 to 74, the formula, each occurrence, should appear as shown below instead of as in the patent:

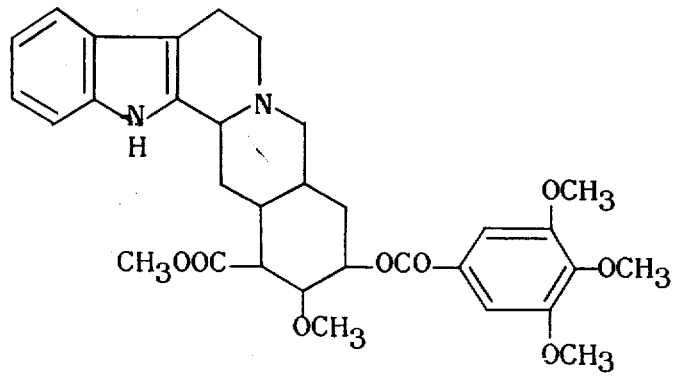

column 6, line 65, opposite the word "Total", for "1.00" read -- 1.0 cc --; column 7, line 53, for "0.56" read -- 0.5 --.

Signed and sealed this 30th day of January 1962.

(SEAL)
Attest:

ERNEST W. SWIDER                      DAVID L. LADD
Attesting Officer                   Commissioner of Patents